(12) United States Patent
Zheng et al.

(10) Patent No.: US 11,531,161 B2
(45) Date of Patent: Dec. 20, 2022

(54) METHODS AND APPARATUS FOR CLEAVING OPTICAL FIBERS

(71) Applicant: AFL Telecommunications LLC, Duncan, SC (US)

(72) Inventors: Wenxin Zheng, Moore, SC (US); Mohamed Amine Jebali, Greer, SC (US); Gongwen Zhu, Duncan, SC (US)

(73) Assignee: AFL Telecommunications LLC, Duncan, SC (US)

( * ) Notice: Subject to any disclaimer, the term of this patent is extended or adjusted under 35 U.S.C. 154(b) by 941 days.

(21) Appl. No.: 16/306,787

(22) PCT Filed: Jun. 7, 2017

(86) PCT No.: PCT/US2017/036257
§ 371 (c)(1),
(2) Date: Dec. 3, 2018

(87) PCT Pub. No.: WO2017/218251
PCT Pub. Date: Dec. 21, 2017

(65) Prior Publication Data
US 2019/0227235 A1 Jul. 25, 2019

Related U.S. Application Data

(60) Provisional application No. 62/351,693, filed on Jun. 17, 2016.

(51) Int. Cl.
*G02B 6/25* (2006.01)
*B23K 26/38* (2014.01)

(52) U.S. Cl.
CPC ............. *G02B 6/25* (2013.01); *B23K 26/38* (2013.01)

(58) Field of Classification Search
CPC .......... G02B 6/25; B23K 26/38; B23K 26/36; B23K 26/0648; B23K 26/062
(Continued)

(56) References Cited

U.S. PATENT DOCUMENTS

2015/0218038 A1\* 8/2015 Carberry ................ C03B 37/16
65/483

FOREIGN PATENT DOCUMENTS

EP 2898982 B1 \* 10/2017 ........... B23K 26/009

OTHER PUBLICATIONS

AFL Telecommunications LLC; International Patent Application No. PCT/US2017/036257; International Search Report; dated Aug. 18, 2017; (1 page).
(Continued)

*Primary Examiner* — Phuong T Nguyen
(74) *Attorney, Agent, or Firm* — Dority & Manning, P.A.

(57) ABSTRACT

A method for cleaving an optical fiber may include generating a laser beam, such as a $CO_2$ laser beam, for a discrete time period. The laser beam may impact an optical fiber and form a discrete crater extending into the optical fiber from the outer surface thereof. The method may further include pausing generation of the laser beam for a discrete time period, and rotating the optical fiber about a longitudinal axis of the optical fiber. The method may further include repeating generation of the laser beam. A plurality of discrete craters disposed in an annular array about a circumference of the optical fiber may be formed. The method may further include separating the optical fiber into a main optical fiber portion and a cleaved portion after formation of the annular array of discrete craters.

18 Claims, 7 Drawing Sheets

(58) Field of Classification Search
USPC .................................. 219/121.68, 121.69
See application file for complete search history.

(56) References Cited

OTHER PUBLICATIONS

Keiron Boyd et al; "High precision 9.6 μm CO2 laser end-face processing of optical fibres"; Optics Express; vol. 23; No. 11, Jun. 1, 2015; p. 15065, XP055398974.

\* cited by examiner

METHODS AND APPARATUS FOR CLEAVING OPTICAL FIBERS

CROSS-REFERENCE TO RELATED APPLICATIONS

This application is based upon and claims the benefit of priority from U.S. Provisional Patent Application No. 62/351,693, filed Jun. 17, 2016, the disclosure of which is incorporated by reference herein in its entirety.

FIELD OF THE INVENTION

The present disclosure relates generally to methods for cleaving optical fibers, and more specifically to improved methods for cleaving optical fibers using laser beams.

BACKGROUND OF THE INVENTION

Optical fibers are typically cleaved using one of two known methods: scoring the optical fiber and then bending it, or pulling the optical fiber and scoring it. Various mechanical cleaving apparatus are available on the market for performing such cleaving techniques.

However, while such cleaving techniques are sufficient for relatively smaller diameter optical fibers (i.e. below 400 micrometers), they are not sufficient for relatively larger diameter optical fibers (i.e. above 400 micrometers). For example, when cleaving larger diameter optical fibers, the score and bend method often results in a larger than desirable cleave angle. The pull and score method, on the other hand, requires preloading of the optical fiber in high tension, which is generally not feasible for larger diameter optical fibers.

Recently, attempts have been made at developing improved optical fiber cleaving techniques for larger diameter optical fibers. For example, laser cleaving using $CO_2$ lasers has been investigated. Presently known laser cleaving techniques utilize beam ablation technology, wherein the optical fiber glass material is evaporated at the cleave location. However, due to the Gausian shape of the laser beam, it is extremely difficult to obtain a desirably flat, planer end surface on the optical fiber when utilizing such cleave techniques, thus making subsequent splicing and other uses difficult. Other recently developed cleaving techniques suffer from the same disadvantages.

Accordingly, improved methods for cleaving optical fibers are desired in the art. In particular, methods for cleaving optical fibers which provide flatter optical fiber end surfaces and which can be utilized with larger diameter optical fibers would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a method for cleaving an optical fiber is provided. The method may include generating a laser beam, such as a $CO_2$ laser beam, for a discrete time period. The laser beam may impact an optical fiber and form a discrete crater extending into the optical fiber from the outer surface thereof. The method may further include pausing generation of the laser beam for a discrete time period, and rotating the optical fiber about a longitudinal axis of the optical fiber. The method may further include repeating generation of the laser beam. A plurality of discrete craters disposed in an annular array about a circumference of the optical fiber may be formed. The method may further include separating the optical fiber into a main optical fiber portion and a cleaved portion after formation of the annular array of discrete craters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
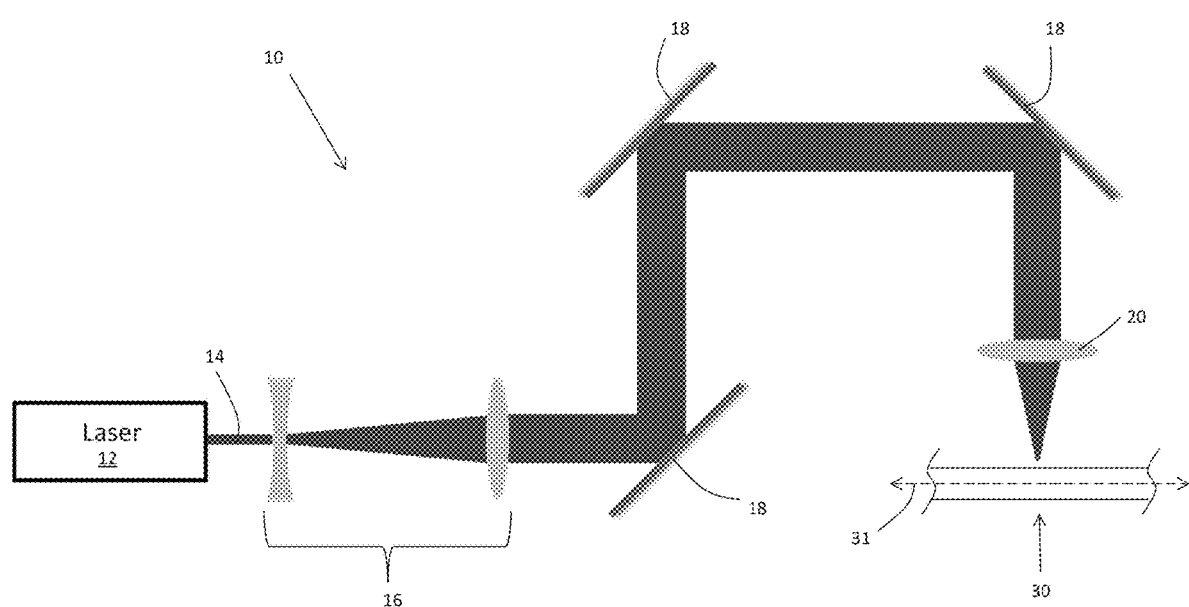
FIG. 1 is a schematic illustration of a laser cleaving apparatus in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to improved methods for cleaving optical fibers. Such methods are particularly useful with optical fibers having maximum outer diameters of greater than or equal to 400 micrometers, although such methods may also be utilized with smaller diameter optical fibers (i.e. less than 400 micrometers). Methods in accordance with the present disclosure advantageously utilize laser beams, such as $CO_2$ laser beams, to facilitate such cleaving. Discrete laser beams are generated and impact the outer surface of the optical fiber. During or between the discrete laser beam pulses, the optical fiber may be rotated about its longitudinal axis. An annular array of craters is thus generated in the optical fiber about the circumference of the optical fiber. The craters can be spaced from each other about the circumference of the optical fiber, or can overlap each other. The optical fiber may then be separated into a main optical fiber portion and a cleaved portion. Methods in accordance with the present disclosure advantageously provide improved main optical fiber portions which have generally flatter, more planer end surfaces.

Referring now to FIG. 1, one embodiment of a laser cleaving apparatus 10 is provided. The laser cleaving apparatus 10 includes a laser 12 which generates a laser beam 14. The laser 12 in exemplary embodiments is a $CO_2$ laser, and the laser beam 14 is thus in exemplary embodiments a $CO_2$ laser beam. In exemplary embodiments, the laser 12 may be set to operate at a frequency of approximately 100 Hertz, although alternatively other suitable frequencies may be utilized.

The apparatus 10 may further include various components for expanding, focusing and/or directing the laser beam 14 after it is emitted from the laser 12. For example, a laser beam expander 16, which may include suitable lenses for facilitating laser beam expansion, may be utilized. The laser beam 14 may travel through and expand within the laser beam expander 16. Additionally, one or more mirrors 18 may be provided for directing the laser beam 14 in various suitable directions as desired. Further, a focusing lens 20 may be provided for focusing the laser beam. Various mirrors 18 may be disposed before the beam expander 16 or after the beam expander 16 (as shown) and before the focusing lens 20 (as shown) or after the focusing lens 20 in the direction of travel of the laser beam 14.

In some exemplary embodiments, a 4× beam expander 16 is particularly suitable for use in a laser cleaving apparatus 10 in accordance with the present disclosure. Alternatively, other suitable beam expanders 16 may be utilized.

In some exemplary embodiments, a 25 millimeter focusing lens 20 is particularly suitable for use in a laser cleaving apparatus 10 in accordance with the present disclosure. Alternatively, other suitable focusing lenses 20 may be utilized. In some embodiments, for example, a focusing lens having a size between 5 millimeters and 200 millimeters may be utilized.

The laser beam 14, typically after travelling through the focusing lens 20, may be directed towards an optical fiber 30. As discussed, optical fibers 30 having diameters of greater than or equal to 400 micrometers, along with optical fibers 30 having diameters of less than 400 micrometers, may be utilized. Suitable apparatus, such as clamps and various motor assemblies and other apparatus, may be utilized to hold the optical fiber 30 in place and move the optical fiber 30 as discussed herein to facilitate cleaving of the optical fiber 30.

Figure 2:
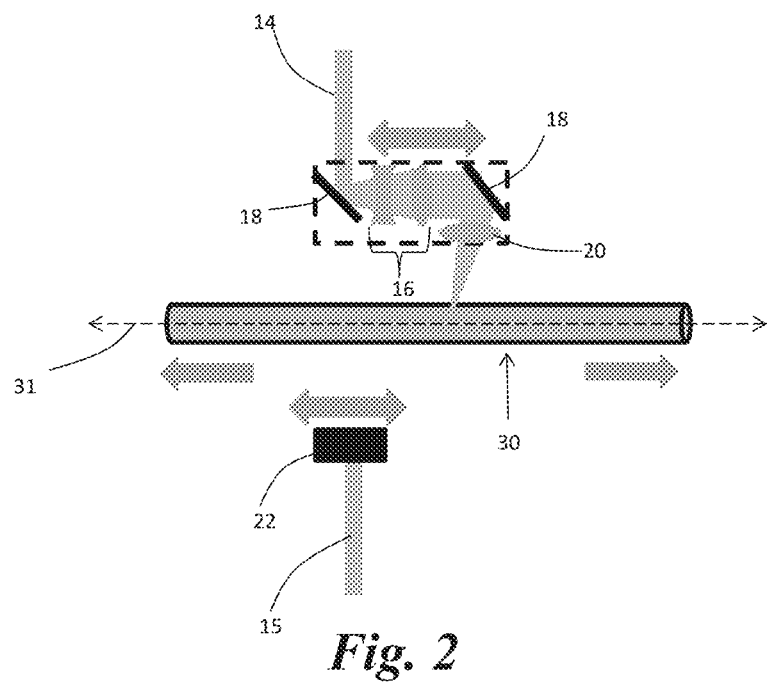
FIG. 2 is a schematic illustration of components of a laser cleaving apparatus in accordance with embodiments of the present disclosure.

Referring now to FIG. 2, in some embodiments various components of the laser cleaving apparatus 10 may advantageously be selectively movable into and out of the path of the laser beam 14. Such movement may facilitate the alternative use of the laser cleaving apparatus 10 as a laser splicing apparatus. For example, as shown, the laser beam expander 16, mirrors 18 and focusing lens 20 may together be movable into and out of the path of the laser beam 14. Further, in some embodiments, a second laser beam 15 may generated. This laser beam 15 may be generated from a separate laser, or from the same laser 12 as laser beam 14 and produced via use of a laser splitter. A blocking member 22 may be provided in the apparatus, and may be movable into and out of the path of the laser beam 15 to block the impact of the laser beam 15 on the optical fiber 30. When the beam expander 16, mirrors 18, focusing lens 20, and blocking member 22 are out of the paths of the laser beams 14, 15, the laser beams 14, 15 may impact the optical fiber 30 in a manner in which splicing is facilitated. Accordingly, multiple optical fibers 30 may be provided for splicing and may be spliced together via use of the laser beams 14, 15. When the beam expander 16, mirrors 18, focusing lens 20, and blocking member 22 are moved into the paths of the laser beams 14, 15, the second laser beam 15 may be blocked from impacting the optical fiber(s) 30, and the laser beam 14 may impact the optical fiber 30 in a manner in which cleaving is facilitated.

Referring now to FIGS. 3 through 8, methods for cleaving optical fibers 30 in accordance with the present disclosure may utilize laser beams 14 to facilitate such cleaving. For example, a method in accordance with the present disclosure may include positioning an optical fiber 30 on a laser cleaving apparatus 10. The optical fiber 30 may be positioned such that an emitted laser beam 14 impacts an outer surface 32 of the optical fiber 30.

Figure 3:
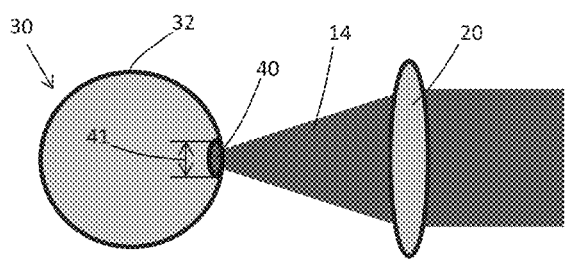
FIG. 3 is a cross-sectional view of an optical fiber during a discrete impact by a laser beam in accordance with embodiments of the present disclosure.

As illustrated in FIG. 3, a method in accordance with the present disclosure may further advantageously include generating a laser beam 14 for a discrete time period, such as a first discrete time period. Such time period may, for example, be predetermined and, for example, programmed into a controller of the apparatus being utilized to perform such method. The discrete laser beam 14 may impact the outer surface 32 of the optical fiber 30 at a discrete location, forming a discrete crater 40 in the optical fiber 30. Notably, each formed crater 40 may have an individual depth that is less than the maximum diameter of the optical fiber 30. The maximum depth and diameter of each crater 40 may be correlated to the maximum diameter of the optical fiber 30 being cleaved to facilitate improved cleaving. In some embodiments, for example, a maximum diameter 41 of each formed crater 40 may be between 15 micrometers and 150 micrometers, such as between 20 micrometers and 100 micrometers.

The discrete time period may, for example, be between 30 microseconds and 500 milliseconds, such as between 100 microseconds and 400 milliseconds, such as between 5 milliseconds and 200 milliseconds, such as between 10 milliseconds and 100 milliseconds.

A method in accordance with the present disclosure may further include pausing generation of the laser beam 14 for a discrete time period, such as a second predetermined time period. Such time period may, for example, be predetermined and, for example, programmed into a controller of the apparatus being utilized to perform such method. Such discrete time period may, for example, be between 1 microsecond and 10 milliseconds, such as between 10 microseconds and 5 milliseconds, such as between 15 microseconds and 1 millisecond, such as between 20 microseconds and 200 microseconds.

Figure 4:
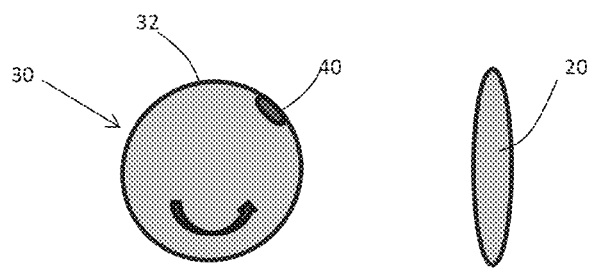
FIG. 4 is a cross-sectional view of an optical fiber during rotation after an impact by a laser beam in accordance with embodiments of the present disclosure.

As illustrated in FIG. 4, a method in accordance with the present disclosure may further include rotating the optical fiber 30 about a longitudinal axis 31 thereof. Such rotation may occur during generation of the laser beam 14 and/or during pausing of generation of the laser beam 14.

Figure 5:
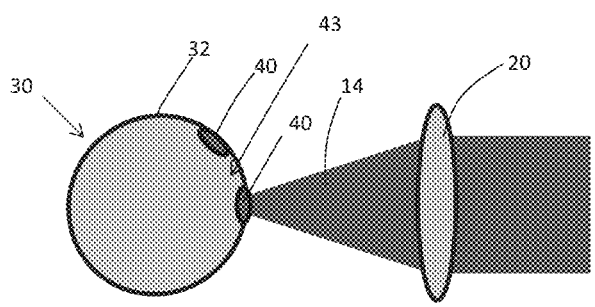
FIG. 5 is a cross-sectional view of an optical fiber during another discrete impact by a laser beam in accordance with embodiments of the present disclosure.
Figure 7:
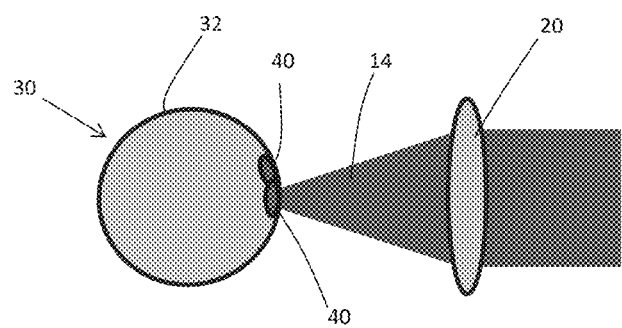
FIG. 7 is a cross-sectional view of an optical fiber during a discrete impact by a laser beam in accordance with embodiments of the present disclosure.

As illustrated in FIGS. 5 and 7, a method in accordance with the present disclosure may further include, for example, repeating the generating step. Further, a method in accordance with the present disclosure may include, for example, repeating the pausing step and the rotating step. Accordingly, multiple discrete craters 40 may be formed in the optical fiber 30.

Figure 6:
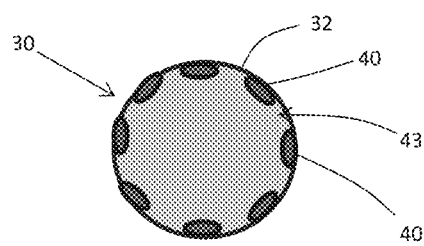
FIG. 6 is a cross-sectional view of an optical fiber after a plurality of discrete impacts by a laser beam in accordance with embodiments of the present disclosure.
Figure 8:
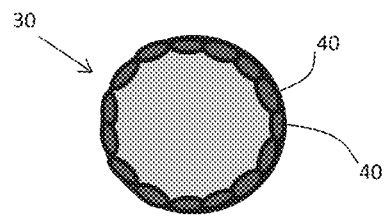
FIG. 8 is a cross-sectional view of an optical fiber after a plurality of discrete impacts by a laser beam in accordance with embodiments of the present disclosure.

FIGS. 6 and 8 illustrate an optical fiber 30 after formation of a plurality of discrete craters 40 therein. Notably, due to rotation of the optical fiber 30 about the longitudinal axis 31, the discrete craters 40 may be disposed in an annular array about a circumference of the optical fiber 30. Accordingly, the discrete craters 40 may be generally oriented in a plane that is generally perpendicular to the longitudinal axis 31.

In some embodiments, as illustrated in FIGS. 5 and 6, the discrete craters 40 may be spaced apart from each other (i.e. each discrete crater 40 may be spaced apart from neighboring discrete craters 40) along the circumference of the optical fiber 30. For example, a space 43 between neighboring discrete craters 40 may be between 3 micrometers and 100 micrometers. Alternatively, as illustrated in FIGS. 7 and 8, the discrete craters 40 may be in contact with and optionally overlap each other along the circumference of the optical fiber 30 such that no spaces are provided between neighboring discrete craters 40.

Figure 9:
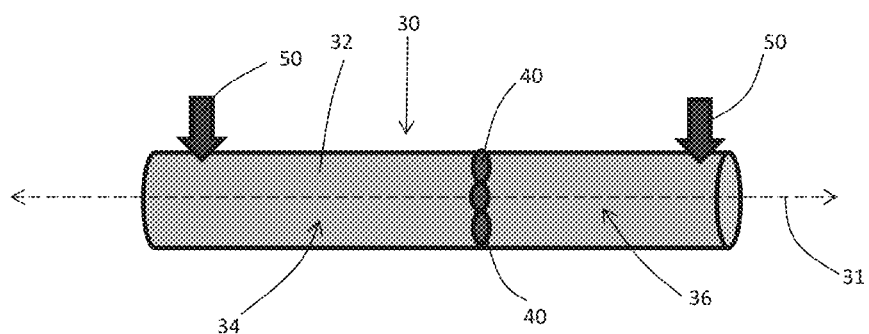
FIG. 9 is a side view of an optical fiber experiencing a separation force in accordance with embodiments of the present disclosure.
Figure 10:
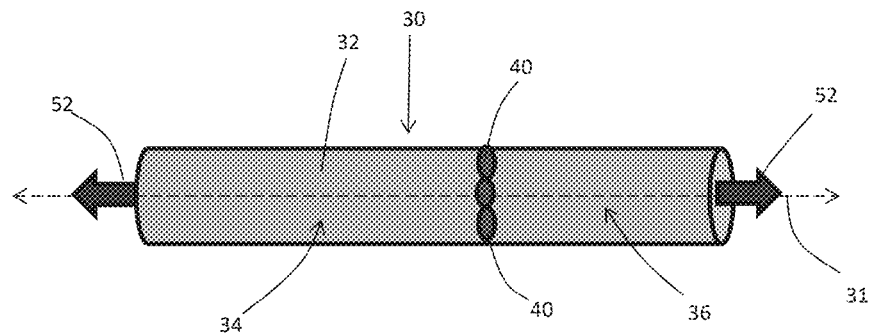
FIG. 10 is a side view of an optical fiber experiencing a separation force in accordance with embodiments of the present disclosure.
Figure 11:
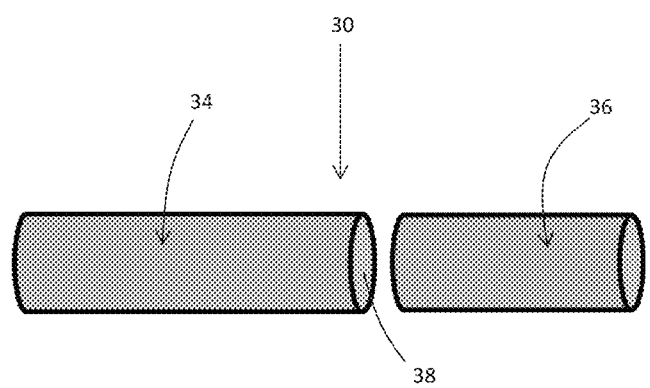
FIG. 11 is a side view of an optical fiber after cleaving in accordance with embodiments of the present disclosure.

Referring now to FIGS. 9 through 11, methods in accordance with the present disclosure may further include, after laser generation and resulting formation of the discrete craters 40, separating the optical fiber 30 into a main optical fiber portion 34 and a cleaved portion 36. The plurality of craters 40 may define the main optical fiber portion 34 and cleaved portion 36.

Separating the optical fiber 30 into the main optical fiber portion 34 and the cleaved portion 36 may, in some exemplary embodiments, include applying a force to the optical fiber 30, such as to one or both portions. For example, in some embodiments, as illustrated in FIG. 9, a bending force 50 may be applied to one or both of the main optical fiber portion 34 and the cleaved portion 36. The bending force may, for example, be applied in a direction perpendicular to the longitudinal axis 31 or at a suitable angle to the longitudinal axis 31. Additionally or alternatively, as illustrated in FIG. 10, a tensile force 52 may be applied to one or both of the main optical fiber portion 34 and the cleaved portion 36. The tensile force 52 may, for example, be applied along the longitudinal axis 31. Additionally or alternatively, a twisting force may be applied to one or both of the main optical fiber portion 34 and the cleaved portion 36. The twisting force may, for example, be applied about the longitudinal axis 31.

In alternative embodiments, rather than applying a force to one or both portion of the optical fiber 30, subsequent discrete craters may be generated via subsequent impacts of generated laser beams 14 on the optical fiber 30. For example, after the initial annular array of discrete craters 40 is formed, the generating step and the pausing and rotating steps may continue in an auxiliary sub-method. For example, after the initial annular array of discrete craters 40 is formed, the laser beam 14 may be adjusted to impact the optical fiber 30 within the discrete craters 40. The auxiliary sub-method of generating, pausing and rotating as discussed herein may then occur, such that subsequent discrete craters are formed in the optical fiber 30. Each subsequent discrete crater may, for example, be formed through laser beam 14 impact within one of the plurality of initial craters 40. One or more subsequent annular arrays of craters 40, each generally within the same circumference and plane as discussed above, may thus be formed. Eventually, formation of such craters may cause the optical fiber 30 to separate into the main optical fiber portion 34 and the cleaved portion 36.

Use of methods in accordance with the present disclosure may advantageously provide improved optical fiber 30 cleaving. For example, the resulting end surface 38 of the main optical fiber portion 34 after separation from the cleaved portion 36 may advantageously be relatively flat and planer, such as planer in a plane generally perpendicular to the longitudinal axis 31. Further, as discussed herein, such methods can advantageously be used with a wide variety of optical fibers 30, including optical fibers 30 having relatively large maximum diameters as discussed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for cleaving an optical fiber, comprising:
generating a laser beam for a first discrete time period, the first discrete time period between 30 microseconds and 500 milliseconds, wherein the laser beam impacts the optical fiber and forms a discrete crater in the optical fiber and generates a flat, planar end surface at the optical fiber;
pausing generation of the laser beam for a second discrete time period, the second discrete time period between 1 microsecond and 10 milliseconds;
rotating the optical fiber about a longitudinal axis of the optical fiber; and
repeating the generating step,
wherein the discrete craters are disposed in an annular array about a circumference of the optical fiber.

2. The method of claim 1, wherein the rotating step occurs during the pausing step.

3. The method of claim 1, wherein the rotating step occurs during the generating step.

4. The method of claim 1, wherein each discrete crater has a maximum diameter of between 15 micrometers and 150 micrometers.

5. The method of claim 1, further comprising separating the optical fiber into a main optical fiber portion and a cleaved portion.

6. The method of claim 5, wherein the separating step comprises applying a bending force to the optical fiber.

7. The method of claim 5, wherein the separating step comprises applying a tensile force to the optical fiber.

8. The method of claim 5, wherein the separating step comprises applying a twisting force to the optical fiber.

9. The method of claim 5, wherein the separating step comprises repeating the generating step, pausing step, and rotating step to form a subsequent annular array of discrete craters.

10. The method of claim 1, wherein the discrete craters are spaced apart from each other.

11. The method of claim 1, wherein the discrete craters are in contact with each other.

12. The method of claim 1, wherein the laser beam is a CO2 laser beam.

13. A laser cleaving apparatus for cleaving an optical fiber, the laser cleaving apparatus comprising:
- a laser operable to generate a laser beam for a first discrete time period between 30 microseconds and 500 milliseconds and a second discrete time period between 1 microsecond and 10 milliseconds, wherein the laser beam impacts the optical fiber and forms a discrete crater in the optical fiber and generate a flat, planar end surface at the optical fiber;
- an expander;
- a mirror; and
- a focusing lens, wherein the expander, the mirror, and the focusing lens are selectively movable into and out of a path of the laser beam.

14. The laser cleaving apparatus of claim 13, wherein the laser beam is a first laser beam, and further comprising a blocking member selectively movable into and out of a path of a second laser beam.

15. The laser cleaving apparatus of claim 13, wherein the laser is a CO2 laser.

16. The laser cleaving apparatus of claim 13, wherein the expander is a 4× expander.

17. The laser cleaving apparatus of claim 13, wherein the focusing lens is between a 5 millimeters and a 200 millimeter focusing lens.

18. The laser cleaving apparatus of claim 13, wherein the laser is operable to generate the laser beam for the first discrete time period, pause generation of the laser beam for the second discrete time period, and repeat the generating and pausing of the laser beam.

* * * * *